US009399961B2

(12) United States Patent
Lehmen et al.

(10) Patent No.: US 9,399,961 B2
(45) Date of Patent: Jul. 26, 2016

(54) METHOD AND SYSTEM FOR AIR FUEL RATIO CONTROL AND DETECTING CYLINDER IMBALANCE

(71) Applicant: Ford Global Technologies, LLC, Dearborn, MI (US)

(72) Inventors: Allen Lehmen, Howell, MI (US); Douglas James McEwan, Royal Oak, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 14/524,981

(22) Filed: Oct. 27, 2014

(65) Prior Publication Data

US 2016/0115879 A1    Apr. 28, 2016

(51) Int. Cl.
  *F02D 41/00*   (2006.01)
  *F02D 37/02*   (2006.01)
  *F02D 41/14*   (2006.01)

(52) U.S. Cl.
  CPC ............ *F02D 37/02* (2013.01); *F02D 41/1444* (2013.01)

(58) Field of Classification Search
  CPC . F02D 41/00; F02D 41/1444; F02D 41/1454; F02D 41/1401; F02D 37/00
  See application file for complete search history.

(56) References Cited

U.S. PATENT DOCUMENTS

| 6,314,952 | B1 * | 11/2001 | Turin ................. F02D 41/0085 123/673 |
| 7,721,591 | B2 | 5/2010 | Maegawa |
| 7,802,563 | B2 | 9/2010 | Behr et al. |
| 7,823,563 | B2 * | 11/2010 | Jankovic ................. F01N 5/02 123/436 |
| 8,452,517 | B2 | 5/2013 | Sawada et al. |
| 8,452,521 | B2 | 5/2013 | Iwazaki et al. |
| 8,510,017 | B2 | 8/2013 | Sawada et al. |
| 8,548,718 | B2 | 10/2013 | Kato et al. |
| 8,560,208 | B2 | 10/2013 | Miyamoto et al. |
| 8,589,055 | B2 | 11/2013 | Hakariya et al. |
| 2012/0215427 | A1 | 8/2012 | Miyamoto et al. |

FOREIGN PATENT DOCUMENTS

JP    2013057271 A  *  3/2013  ............. F02D 41/00

OTHER PUBLICATIONS

Nakagawa, S. et al., "A New Diagnosis Method for an Air-Fuel Ratio Cylinder Imbalance," SAE Technical Paper Series No. 2012-01-0718, published Apr. 16, 2012, 9 pages.

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Air/fuel imbalance monitoring systems and methods for monitoring air/fuel ratio imbalance of an internal combustion engine are disclosed. In one embodiment, adjusting engine operation responsive to cylinder air/fuel imbalance based on a determined total number of instances where sensed peak-to-peak exhaust air-fuel ratios differentials are less than a threshold normalized to a total number of peak-to-peak oscillations. The approach can be used to indicate air/fuel ratio imbalances between engine cylinders.

20 Claims, 8 Drawing Sheets

METHOD AND SYSTEM FOR AIR FUEL RATIO CONTROL AND DETECTING CYLINDER IMBALANCE

FIELD

The present description relates generally to methods and systems for detecting cylinder combustion imbalance in an engine.

BACKGROUND/SUMMARY

Engine air-fuel ratio may be maintained at a desired level (e.g., stoichiometric) in order to provide desired catalyst performance and reduced emissions. Typical feedback air-fuel ratio control includes monitoring of exhaust gas oxygen concentration by an exhaust sensor(s) and adjusting fuel and/or charge air parameters to meet a target air-fuel ratio. However, such feedback control may overlook cylinder-to-cylinder variation in air-fuel ratio, which may degrade engine performance and emissions. While various approaches have been set forth for individual cylinder air/fuel control, with the aim at reducing cylinder to cylinder air/fuel ratio variation, such variation may still persist as recognized by the inventors herein. For example, issues with cylinder air/fuel ratio imbalance may include increased $NO_x$, CO, and hydrocarbon emissions, knocking, poor combustion, and decreased fuel economy.

Example methods to address air/fuel ratio imbalance include counting air/fuel ratio deviations from an expected value when applying an air-fuel ratio dither control. One example of a counting approach is shown by Hasegawa et al. in U.S. Pat. No. 7,721,591. Therein, when the number of times that deviation of a particular cylinder's air/fuel ratio exceeds a threshold is greater than a predetermined number, it is concluded that an abnormality occurs in that cylinder of the engine. Another approach for air/fuel ratio imbalance determination includes a differential summation method, which samples exhaust gas sensor signal differential values (e.g., lengths) at frequencies corresponding to the engine firing frequency or twice engine firing frequency, and calculates a summation of those values that are greater than a noise rejection floor threshold. The summation is then compared to a failure threshold value for determining cylinder air-fuel imbalance.

However, the inventors herein have also recognized potential issues with such systems. As one example, the approach described in Hasegawa relies on air-fuel ratio dither control to differentiate the air-fuel ratio of each individual cylinder. The dither control purposely varies the air-fuel ratio of a given cylinder. Such air-fuel ratio control is intrusive and may result in degraded emissions and/or over-fueling events. In another example, the summation method may suffer from sampling variation of differential signal lengths that leads to inconsistent results. Further, many of the differential signal lengths collected in the summation method may fall into a sensor signal noise band, where fault separation between small and large deviations from stoichiometric air-fuel ratio is low. To compensate for this, the noise floor threshold may be increased, leading to a diminished sample size and unreliable results. Another limitation to the summation method is its constriction to higher vehicle loads.

In one example, the issues described above may be addressed by a method for adjusting engine operation responsive to cylinder air/fuel imbalance. The imbalance is determined based on a total number of instances where sensed peak-to-peak exhaust lambda differentials are less than a threshold normalized to a total number of peak-to-peak oscillations. In this way, cylinder air/fuel imbalance may be monitored non-intrusively during normal engine operation by counting instances where peak-to-peak lambda differentials are below a threshold (e.g., are not indicative of cylinder imbalance) and comparing the counted instances against an imbalance threshold. By analyzing differentials that fall below a noise threshold, the number of samples counted may be increased and a greater fault separation may be provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Hereafter, a diagnosing method and a diagnostic system of an engine system are described more specifically referring to the appended drawings. Note that the following description of an embodiment is one example an illustration, and various alternative embodiments may also be used.

Figure 1:
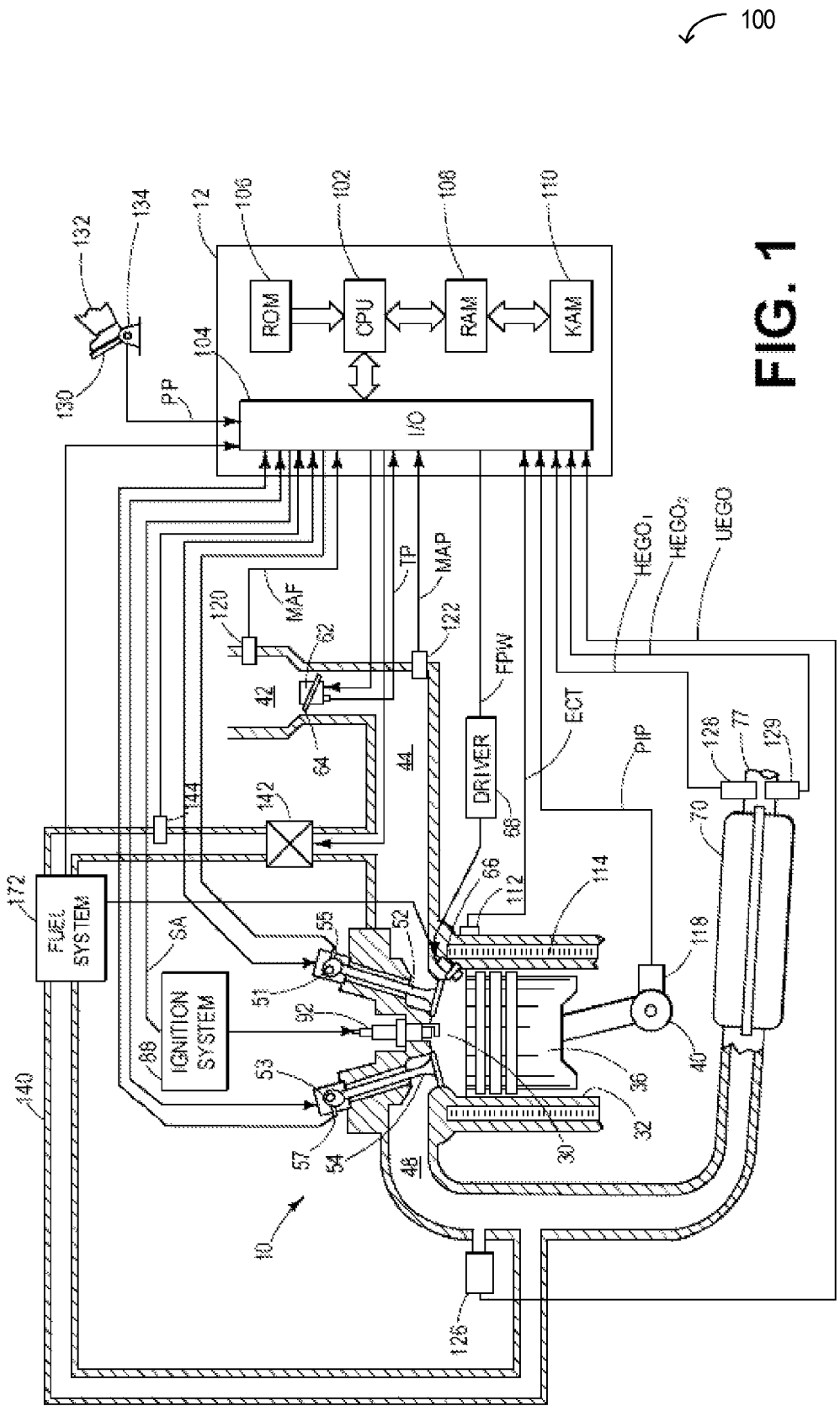
FIG. 1 shows a schematic depiction of an example vehicle system.

FIG. 1 illustrates a schematic diagram showing an engine system 100 including one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a NOx, HC, or CO sensor. In one embodiment, upstream exhaust gas sensor 126 is a UEGO configured to provide output, such as a voltage signal, that is proportional to the amount of oxygen present in the exhaust. Controller 12 uses the output to determine the exhaust gas air-fuel ratio.

Emission control device 70 is shown arranged along exhaust passage 48 downstream of exhaust gas sensor 126. Device 70 may be a three-way catalyst (TWC), configured to reduce NOx and oxidize CO and unburnt hydrocarbons. In some embodiments, device 70 may be a NOx trap, various other emission control devices, or combinations thereof.

A second, downstream exhaust gas sensor 128 is shown coupled to exhaust passage 48 downstream of emissions control device 70. Downstream sensor 128 may be any suitable sensor for providing an indication of exhaust gas air-fuel ratio such as a UEGO, EGO, HEGO, etc. In one embodiment, downstream sensor 128 is a HEGO configured to indicate the relative enrichment or enleanment of the exhaust gas after passing through the catalyst. As such, the HEGO may provide output in the form of a switch point, or the voltage signal at the point at which the exhaust gas switches from lean to rich.

A third, downstream exhaust gas sensor 129 is shown coupled to exhaust passage 48 downstream of emissions control device 70 and symmetrically opposed to HEGO sensor 128. Downstream sensor 129 may be any suitable sensor for providing an indication of exhaust gas air-fuel ratio such as a UEGO, EGO, HEGO, etc. In one embodiment, downstream sensor 129 is a HEGO configured to indicate the relative enrichment or enleanment of the exhaust gas after passing through the catalyst. As such the HEGO may provide output in the form of a switch point, or the voltage signal at the point at which the exhaust gas switches from lean to rich.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure (MAP) signal from sensor 122. Engine speed, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 1.

Figure 2:
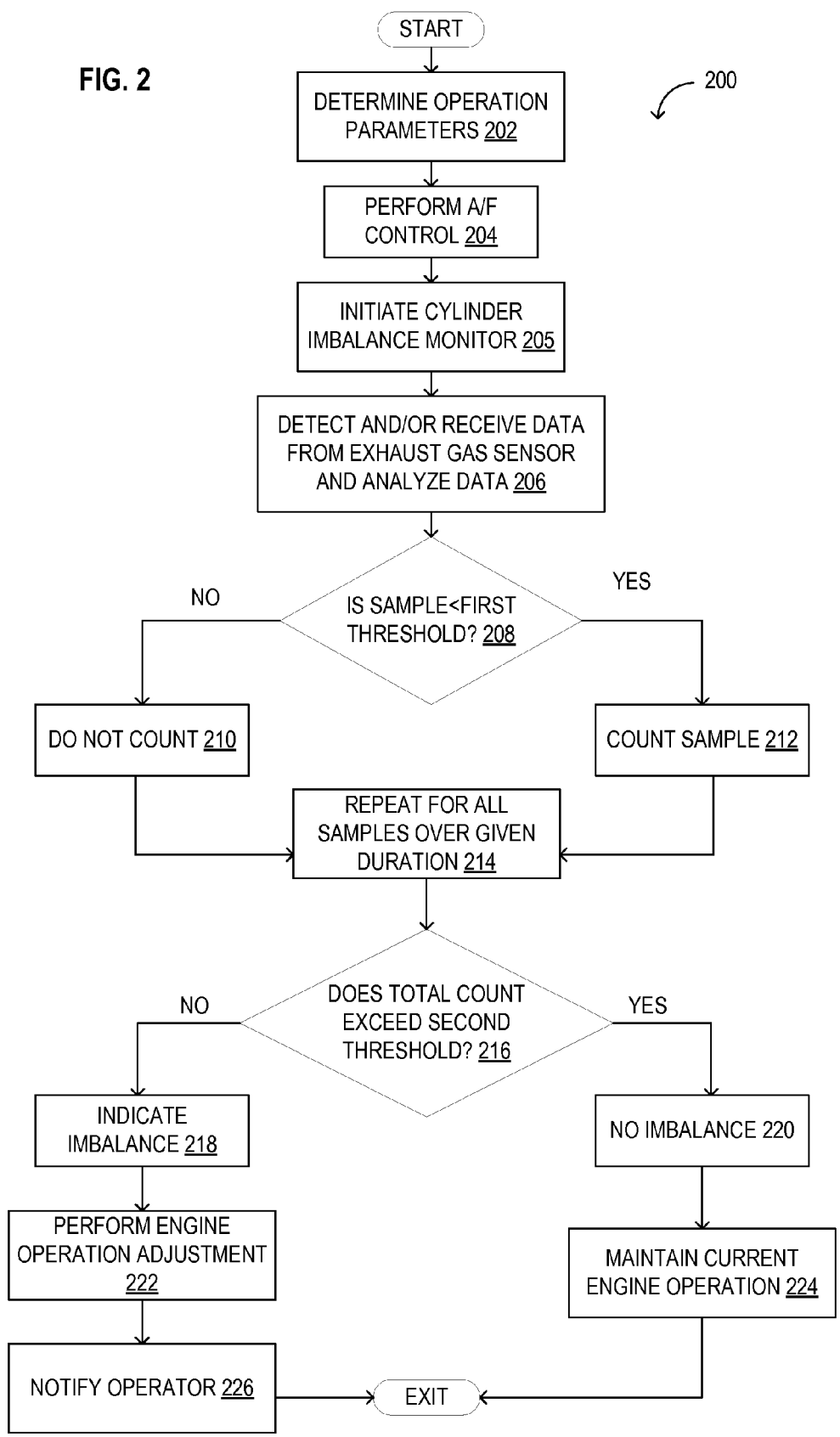
FIG. 2 shows a high-level flow chart illustrating an example method for conducting a count method for measuring air/fuel deviation from stoichiometric.

FIG. 2 is a high-level flow chart illustrating an example method 200 for identifying air/fuel imbalance faults using a count method in accordance with the current disclosure. In particular, method 200 relates to using a number of signals to identify an air/fuel imbalance fault associated with a cylinder. Method 200 will be described herein with reference to the components and systems depicted in FIG. 1, though it should be understood that the method may be applied to other systems without departing from the scope of this disclosure. Method 200 may be carried out by controller 12, and comprises calculating an air/fuel ratio from an exhaust gas sensor, such as sensor 126 located upstream of a catalyst.

Method 200 may be implemented in the system 100 of FIG. 1. For example, the controller 12 may include one or more of the hardware and/or software that are configured to implement method 200 in combination with the illustrated engine hardware, such as the various sensors and actuators.

At 202, the method includes determining engine operational parameters. The engine operational parameters may include, but are not limited to, engine speed, engine load, commanded air-fuel ratio, exhaust air-fuel ratio as measured by an exhaust gas sensor (such as sensor 126), and other parameters. At 204, the method includes performing engine air/fuel control. The air/fuel control may include determining a commanded (e.g., target) engine air-fuel ratio (based on engine speed and load, for example), determining current exhaust air-fuel ratio based on feedback from the exhaust gas sensor, and adjusting one or more engine operating parameters (such as fuel injection quantity) based on the difference between the target and current air-fuel ratio. The exhaust gas sensor used in the air/fuel control may be a UEGO sensor positioned upstream of a catalyst, for example.

During the air/fuel control, exhaust gas may be routed from a group of cylinders to the exhaust gas sensor. The exhaust gas sensor may be positioned in such a way so that the exhaust gas from a group of cylinders, such as a group of cylinders in an engine cylinder bank, upstream of the exhaust gas sensor is routed to the exhaust gas sensor. In one example, exhaust gas from only a sub-set of the engine cylinders is routed to the sensor. For example, the exhaust gas sensor may be positioned at or downstream of a confluent point of the exhaust where sub-branches of the exhaust manifold leading from individual cylinders of a corresponding engine cylinder bank of the internal combustion engine gather, but upstream of a confluent point of the exhaust manifold where branches of the exhaust manifold leading from individual engine cylinder banks gather. In this way, only the exhaust gas from a corresponding group of cylinders may be routed to an exhaust gas sensor.

At 205, method 200 may initiate a cylinder imbalance monitor. Briefly, the cylinder imbalance monitor collects and analyzes exhaust gas sensor output in order to determine if a cylinder air/fuel imbalance is present, as will be explained below. Furthermore, a single gas sensor may be used for both monitoring air/fuel ratio imbalance due to cylinder-to-cylinder air/fuel variation and providing air/fuel feedback control for a plurality of engine cylinders. The cylinder imbalance monitor may be initiated at any time during engine operation, or it may be initiated only under certain operating conditions. For example, the imbalance monitor may be initiated only during steady state operating conditions and/or only once the engine has reached an optimal operating temperature. This may be due to an exhaust gas sensor's temperature being too low to operate accurately. In some examples, the cylinder imbalance monitor may be executed all the time during engine operation, or it may be executed only periodically.

At 206, the method includes detecting and/or receiving a signal from the exhaust gas sensor. The signal detected for each of the exhaust gas sensors may include a voltage output indicative of exhaust oxygen concentration that may be converted to air-fuel ratio. However, such detected air-fuel ratio may be indicative of overall exhaust air-fuel ratio, and thus may be difficult to correlate to a particular cylinder of the engine. To differentiate each cylinder's individual air-fuel ratio, the exhaust gas sensor signal may be sampled at a frequency at or above the firing frequency of the engine, as explained below.

An example method for sampling the exhaust gas sensor signal performed at 206 may involve sampling the exhaust gas sensor by the controller at half or full PIP intervals. The controller may then conduct a calculation in order to determine an air-fuel ratio differential (referred to as LAMDIF) value based on the exhaust gas sensor samples over consecutive PIP signals. The method may then proceed to 208 and compare LAMDIF values against a threshold. The threshold in this example may be used to take advantage of the data that might otherwise be misinterpreted with signal noise. For example, the threshold may a suitable threshold that excludes samples limiting fault separation while maintaining a large sample size to count from in order to determine a diagnosis confidently. This provides improved fault separation. In one example, the threshold may be in a range from 0.1-0.175. This example is discussed in more detail in FIGS. 3 and 6.

A second example method for sampling the exhaust gas sensor signal performed at 206 may include sampling peak-to-peak differentials from an exhaust gas sensor over a given duration (e.g., multiple engine cycles). The amplitude from peak-to-peak oscillations may be calculated and measured against a threshold. The threshold may be the same threshold discussed above (e.g., fixed in the range of 0.1-0.175) or it may vary based on operating parameters. In one example, the threshold may change as engine speed and/or load changes, e.g., the threshold may increase as engine speed increases. The use of the threshold may be for the same reasons as described above in this example. This example is discussed in more detail in FIGS. 4, 7, and 8.

As described in more detail below with respect to FIG. 5, both sampling/counting methods may be executed simultaneously, or only one sampling method/counting method may be executed. By executing only one sampling method, processing load on the controller may be reduced. In contrast, by executing both sampling methods and indicating cylinder imbalance when either one or both sampling methods indicate imbalance, a more sensitive and/or robust imbalance detection may be provided.

At 208, the method includes determining whether or not to count a sample received during the sampling window based on whether the sample is less than the threshold described above. If the answer is no, the method proceeds to 210 and the sample is not counted. If the answer is yes, the sample is less than the threshold and counted. Both processes proceed to 214 (as the non-counted sample will be included in the total possible number of samples described below). At 214, the controller continues method 200, repeating 206 to 212 for all samples over the given duration set by the controller.

At 216, the method may include comparing the number of counted samples, normalized to the total number of samples over a given duration, to a second threshold that indicates if cylinder imbalance is present. The second threshold may be a fixed threshold, such as in the range of 80-90%, or it may vary based on engine speed and/or load, for example. In one example, the second threshold may increase as engine speed increases.

The method may indicate imbalance 218 if the sample count does not exceed the second threshold, and the controller may perform an engine operation adjustment 222 in response to the indicated cylinder imbalance. As an example, adjustments may include limiting engine torque, lowering boost pressure, adjusting spark timing and/or alteration of feedback fueling to maintain a desired air-fuel ratio (e.g., limiting adjustment of feedback fueling adjustments). After performing the engine operation adjustment, the method may proceed to 226. At 226, the controller may notify an operator of the imbalance via lighting a malfunction indicator lamp and/or the controller may set a diagnostic code stored in the memory of the controller. If the sample count does exceed the second threshold, then no indication of imbalance is indicated 220 and current engine operation is maintained at 224. After 224 or 226, method 200 exits.

Thus, method 200 described above samples an exhaust gas sensor signal at a frequency that corresponds to the firing (or half the firing) frequency of the engine, for example, in order to capture air-fuel ratio data for individual cylinders. The difference between consecutive air-fuel ratios may be determined and compared to a fault threshold. Differential values that are below the threshold display a relatively small amount of deviation from one sample to the next, and thus are not indicative of a cylinder air-fuel ratio fault. Differential values that are above the threshold display a relatively high amount of deviation, however, and may be indicative of a cylinder air-fuel ratio fault. All the differential values that are less than the threshold (e.g., the no-fault samples) are counted, normalized with respect to the total number of samples analyzed, and compared to an imbalance threshold. If the normalized no-fault sample count is less than the imbalance threshold, cylinder imbalance is indicated and engine operation may be adjusted.

This method utilizes the variability of the upstream exhaust gas oxygen sensor (UEGO) present during unstable combustion as an indicator of imbalance. The UEGO sensor is essentially a very rough sine wave. For the purposes of this method, the UEGO sensor voltage (converted to lambse) is sampled every PIP (or half PIP). The sampled signal is then evaluated to determine the peaks of the signal (direction change) and a differential signal length is calculated as the absolute value between consecutive peaks. This air-fuel ratio differential may be referred to as peakdif.

Generally, when no cylinder imbalance is present, peakdif is small. As more cylinder imbalance is introduced, the value of peakdif grows. Due to these differences in signal values, peakdif can be used as an indicator of imbalance. Based on testing results, the magnitude of peakdif (or for that matter any differential sampling of the lambse signal) is not always consistent so integrating the magnitudes of peakdif over a period can result in inconsistent summation results and difficulty in detection. However, "counting" these magnitudes tends to normalize the results. As imbalance becomes present, the number of "peakdif counts below a threshold" will be reduced, resulting in a larger value of fault counts. In some examples, the number of peakdif counts above a threshold could also be used to determine if imbalance is present.

Additionally, the monitor can be run over a wide speed/load range with varying peakdif thresholds depending on the current speed/load, or the counts can be "binned" in various speed/load ranges to allow weighting of data. This may allow the monitor to operate in the most optimized speed/load zones and weight the results appropriately based on detection capabilities.

Thus, the method described above provides for an engine method comprising adjusting engine operation responsive to cylinder air/fuel imbalance. The imbalance is determined based on a total number of instances where sensed peak-to-peak exhaust air-fuel ratios differentials are less than a threshold normalized to a total number of peak-to-peak oscillations.

In one example, the adjusting of engine operation includes limiting adjustment of feedback fueling adjustments to maintain a desired air-fuel ratio. The method may further comprise indicating the determined cylinder imbalance via a diagnostic code stored in memory.

Each sensed peak-to-peak exhaust air-fuel ratio differential may comprise a respective peak-to-peak amplitude of a sampled exhaust gas sensor signal. The exhaust gas sensor signal may be sampled at least once every cylinder firing event.

To determine the total number of instances where sensed peak-to-peak exhaust air-fuel ratios differentials are less than the threshold, the method may comprise determining each peak-to-peak amplitude of the sampled exhaust gas sensor signal over a given duration, and setting the total number of instances as a number of the peak-to-peak amplitudes determined over the given duration that are less than the threshold.

To normalize the total number of instances where sensed peak-to-peak exhaust air-fuel ratios differentials are less than the threshold, the method may comprise dividing the number of the peak-to-peak amplitudes that are less than the threshold by a total number of peak-to-peak amplitudes determined over the given duration in order to determine a normalized number of peak-to-peak amplitudes that are less than the threshold.

In examples, the threshold is a first threshold, and the imbalance is indicated if the normalized number of the peak-to-peak amplitudes that are less than the first threshold is less than a second threshold. In some examples, the first threshold is based on engine speed and/or engine load; for example, as engine speed increases, the first threshold may increase.

Figure 3:
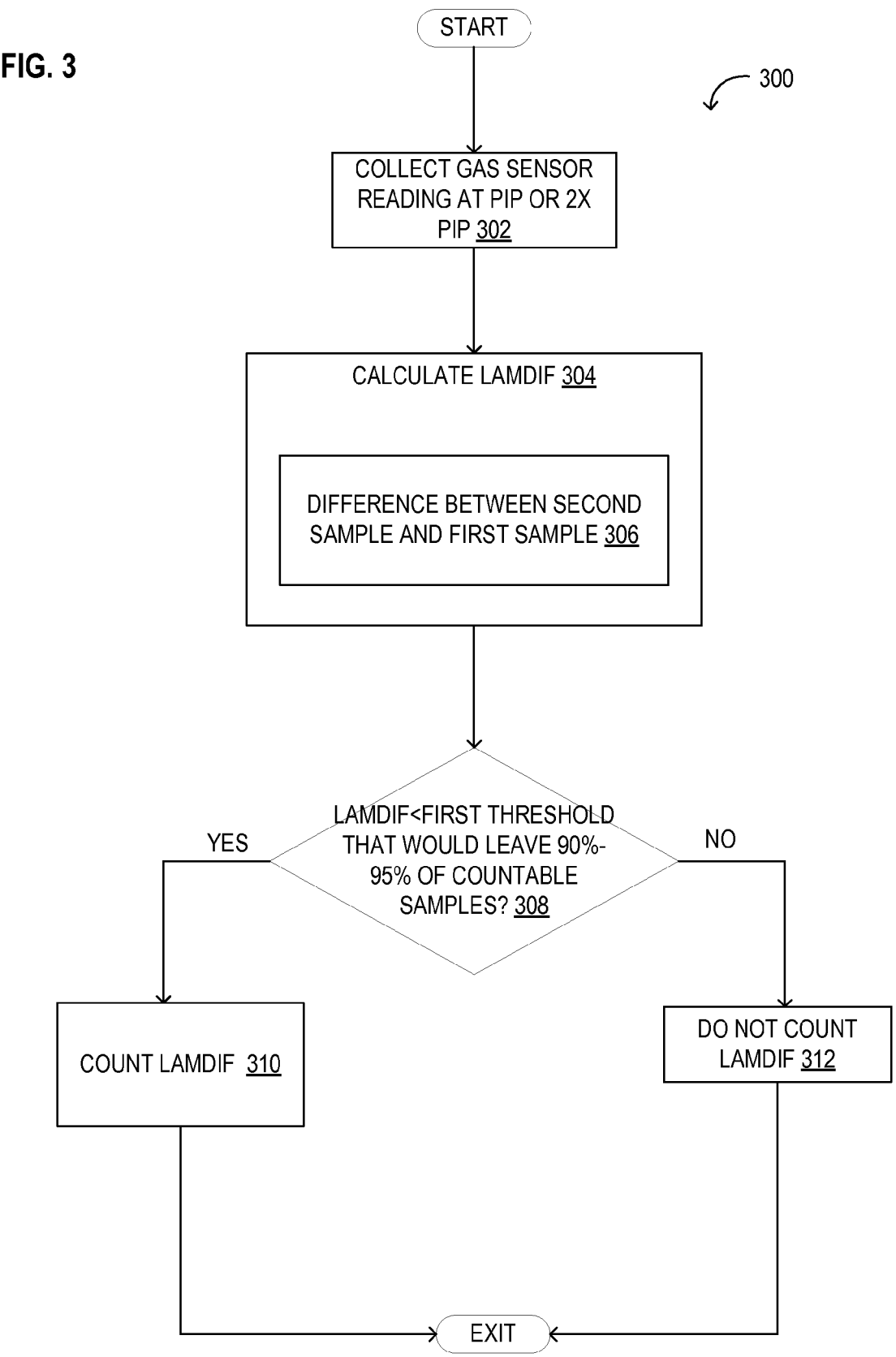
FIG. 3 shows a flow chart illustrating a method for conducting a count method using LAMDIF values.

FIG. 3 is a flow chart of a more detailed exemplary method 300 for using LAMDIF counts for monitoring air/fuel ratio imbalance of an engine (e.g., engine 10) using an exhaust gas sensor positioned in an exhaust gas pathway of the internal combustion engine with a PIP sensor attached to a crankshaft (e.g., crankshaft 40). The method 300 may be implemented in the system 100 of FIG. 1.

Method 300 may be performed as part of method 200, for example in response to the cylinder imbalance monitor being initiated, in order to sample the exhaust gas sensor signal. At 302, the method includes sampling the exhaust gas sensor signal at a frequency over a given duration. The frequency at which the exhaust gas sensor signal is sampled may be a suitable frequency, and may be timed to correspond to individual cylinder firing events. In one example, the signal may be sampled every time the controller receives a PIP signal. The PIP signal may be sent from a crankshaft sensor, such as Hall effect sensor 118, each time a particular tooth (or missing tooth) of a wheel coupled to the crankshaft passes by the Hall effect sensor. In other examples, the exhaust gas sensor signal may be sampled twice every PIP signal, sampled every two PIP signals, or other suitable frequency. The given duration may be a suitable sampling window, and may be a given number of engine cycles (e.g., 50), a given number of sampled sensor signals (e.g., 50 or 100), or a given duration of time, for example.

At 304, the controller calculates a plurality of exhaust air-fuel ratio differentials. This may include converting the sampled exhaust sensor signals to air-fuel ratios (e.g., lambda) and calculating the differential between the air-fuel ratio for a first sample and a second, subsequent sample, also referred to as the LAMDIF, as indicated at 306. Additional detail regarding calculating LAMDIF will be presented below with respect to FIG.

At 308, the method includes determining, for a given calculated LAMDIF, whether LAMDIF is less than a first predetermined threshold. The threshold may represent a value determined by the controller based on current engine operations to include data within a 90%-95% cumulative percentage. That is to say samples below and up to this limit may be counted because their fault separation meets standards to accurately determine deviations from stoichiometric air/fuel ratio. As an example, the first predetermined threshold may include a value range from 0.1-0.175 which may encompass 90%-95% samples of total samples gathered. If the answer is yes, then the method proceeds to 310. At 310, the method includes counting LAMDIF values that are below the first threshold. If the answer at 308 is no, method 300 proceeds to 312, where the method does not count the samples. Both 310 and 312 proceed to 314, where the comparison of LAMDIF to the first threshold is repeated for each calculated LAMDIF over the given duration. Method 300 then ends.

Figure 4:
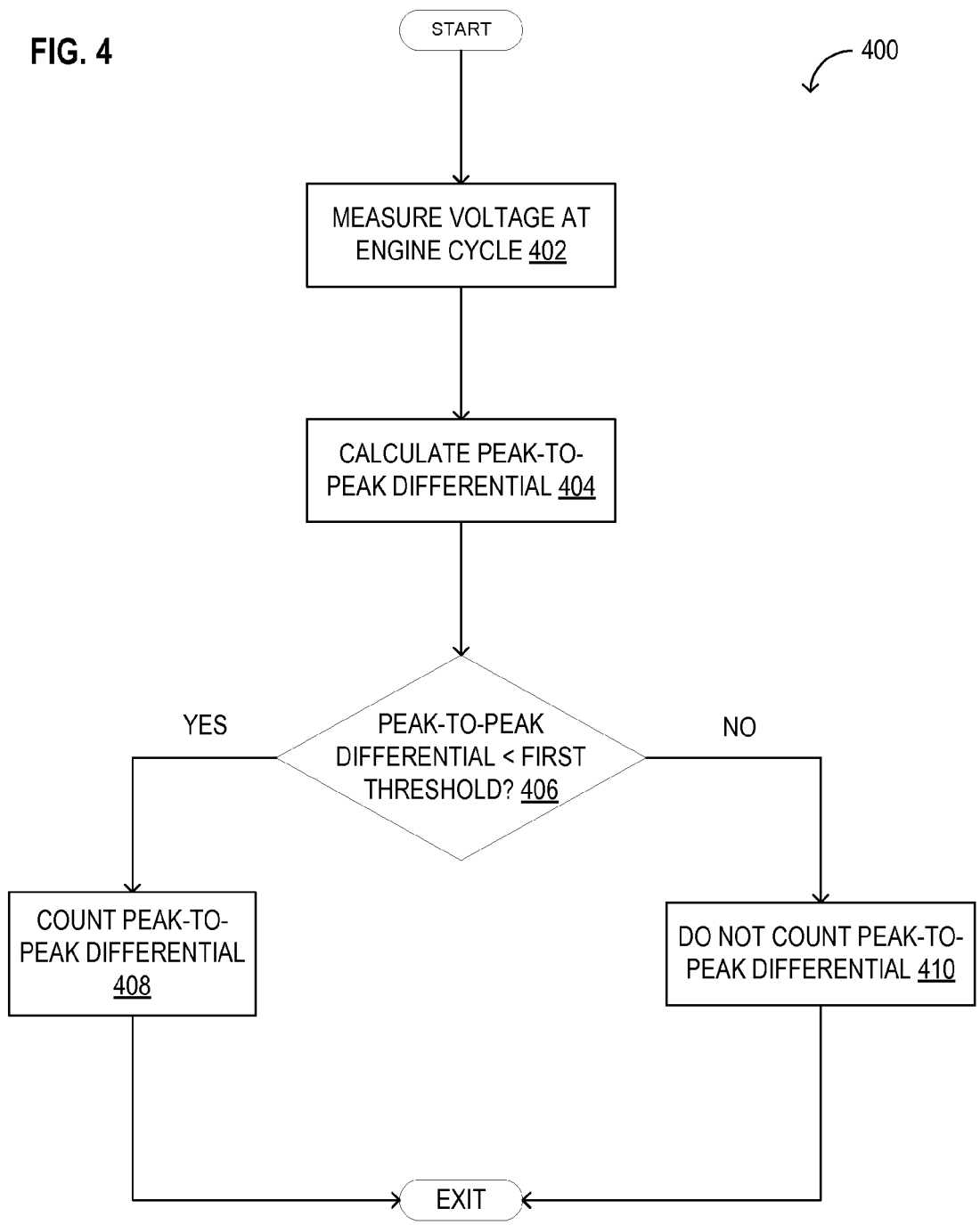
FIG. 4 shows a flow chart illustrating a method for conducting a count method using peak-to-peak differentials.

FIG. 4 is a flowchart of a method 400 for calculating air-fuel ratio differentials based on peak-to-peak exhaust gas sensor signal analysis. Method 400 may be carried out during the execution of method 200, for example in response to the cylinder air/fuel imbalance monitor being initiated. Similar to methods 200 and 300, method 400 monitors air/fuel ratio imbalance of an engine using an exhaust gas sensor (e.g., sensor 126) positioned in an exhaust passage (e.g., exhaust passage 48) of the internal combustion engine (e.g., engine 10). The method 400 may be implemented in the system 100 of FIG. 1. For example, the controller 12 may include instructions stored on the controller that are executed to implement the method 400.

At 402, the controller receives an output from an exhaust gas sensor and stores it memory, which may be illustrated as a graph of air/fuel ratio measured over time. The length of time may correlate to a given number of engine cycles (e.g., 50) or other suitable duration depending on engine speed. At 404, the controller calculates peak-to-peak differentials based on a sample output from 402. The output displays peaks based on the gas sensor output and the peak-to-peak differentials are calculated based on the amplitude of the peaks. Further details of which are further illustrated in reference to FIG. 7 for 402,404.

At 406, the method includes determining whether the peak-to-peak differentials are less than a predetermined first threshold. The first predetermined threshold may be similar to the first threshold described above with respect to FIGS. 2 and 3. If the answer is yes, then the method proceeds to 408. At 408, the method includes counting the peak-to-peak differentials that are less than the first threshold. If the answer is no at 406, the method proceeds to 410 and does not count the peak-to-peak differentials. Method 400 may exit.

Thus, as described above with respect to FIGS. 3-4, an exhaust sensor signal may be sampled at a desired frequency over a given duration and processed to determine if each sample does or does not indicate a cylinder fault. The number of samples that do not indicate a cylinder fault may be compared to an imbalance threshold to determine if a cylinder air-fuel imbalance is present. The exhaust gas sensor signal may be sampled and processed into LAMDIF values or peak-to-peak differentials. In some examples, it may be advantageous to only process the sampled signal according to either the method 300 or the method 400 described above. However, in other examples it may be advantageous to process the exhaust gas sensor signal according to both methods, and indicate cylinder imbalance if either one or both sampling/counting methods indicates cylinder imbalance, as described below with respect to FIG. 5.

Figure 5:
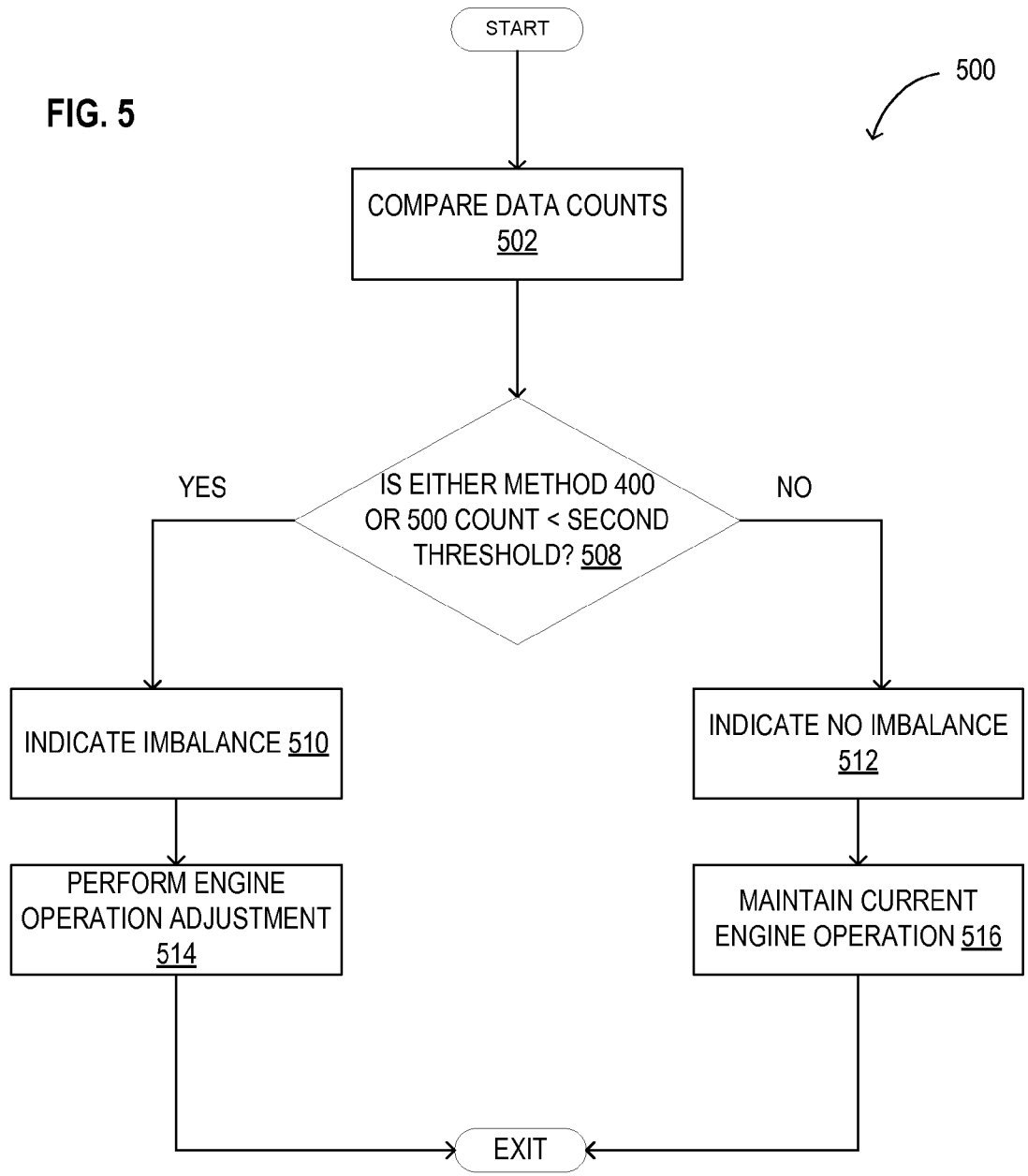
FIG. 5 shows a flow chart illustrating a method for using LAMDIF and peak-to-peak counts to determine air/fuel imbalance.

FIG. 5 is a flowchart detailing method 500 comprising elements of methods 300 and 400. Method 500 may be carried out during the execution of method 200, for example in response to the cylinder air/fuel imbalance monitor being initiated. Similar to methods 200, 300, and 400, method 500 monitors air/fuel ratio imbalance of an engine using an exhaust gas sensor (e.g., sensor 126) positioned in an exhaust passage (e.g., exhaust passage 48) of the internal combustion engine (e.g., engine 10). The method 500 may be implemented in the system 100 of FIG. 1. For example, the controller 12 may include instructions stored on the controller that are executed to implement the method 500. Method 500 utilizes both exhaust gas sensor sampling methods described above with respect to FIGS. 3 and 4 (e.g., the LAMDIF method 300 and the peak-to-peak method 400) in order to perform cylinder air/fuel ratio imbalance diagnostics. Many benefits may be present for running both methods simultaneously, including but not limited to, greater sensitivity towards cylinder imbalance, a larger data set, and a backup count in case of a malfunction in a method.

At 502, the method includes comparing the data counts from methods 300 and 400. At 504, the method includes determining whether either method 300 or 400 have a count less than the second predetermined threshold. As one example, at 504, if one or more of the method counts is less than the second threshold, then the method continues to 506 and indicates imbalance and continues to 510. If both counts are greater than the second threshold, no imbalance is indicated 508. At 510, the controller may perform an engine adjustment in order to diagnose the air/fuel ratio imbalance. At 512, the controller may choose to maintain current engine operation. A benefit of running both methods to measure air/fuel ratio imbalance may be to provide better detection of cylinder imbalance. Methods 300 and 400 evaluate the same data differently, if one method meets its second threshold and the other method does not, this may help detect an air/fuel imbalance that may not have been calculated with only one method.

As a second example, at 504, only if both methods 300 and 400 have counts less than the second threshold does the method continue to 508 to indicate an imbalance As described above, multiple benefits nay exist to running both methods simultaneously, while indicating imbalance only if one method provides a count greater than the second threshold. As an example, one method may be more reliable than the other method at a given engine operation (e.g., one method may be more reliable at high speeds and loads, while the other method may be more reliable at low speeds and loads). The controller may then indicate imbalance even if only one of the two methods exceeds the second threshold. However, in some examples, in order to indicate imbalance, both sampling methods may have to have counts that exceed the second threshold. This may ensure a robust detection method that avoids false positive indications of cylinder imbalance. Method 500 may exit.

Thus, the method 500 described above may sample an exhaust gas sensor signal to determine both LAMDIF values and peak-to-peak differential values and compare each respective value to a first threshold. For each of the LAMDIF and peak-to-peak values, the values that are less than the first threshold are counted (e.g., sorted into a no-fault group) and normalized with respect to a total number of samples analyzed. Each normalized no-fault group is compared to a second threshold. In one example, cylinder imbalance may be indicated if either normalized no-fault group (e.g., the group including LAMDIF values or the group including peak-to-peak values) is less than the second threshold. In another example, cylinder imbalance may be indicated only if both normalized no-fault groups are less than the second threshold.

Figure 6:
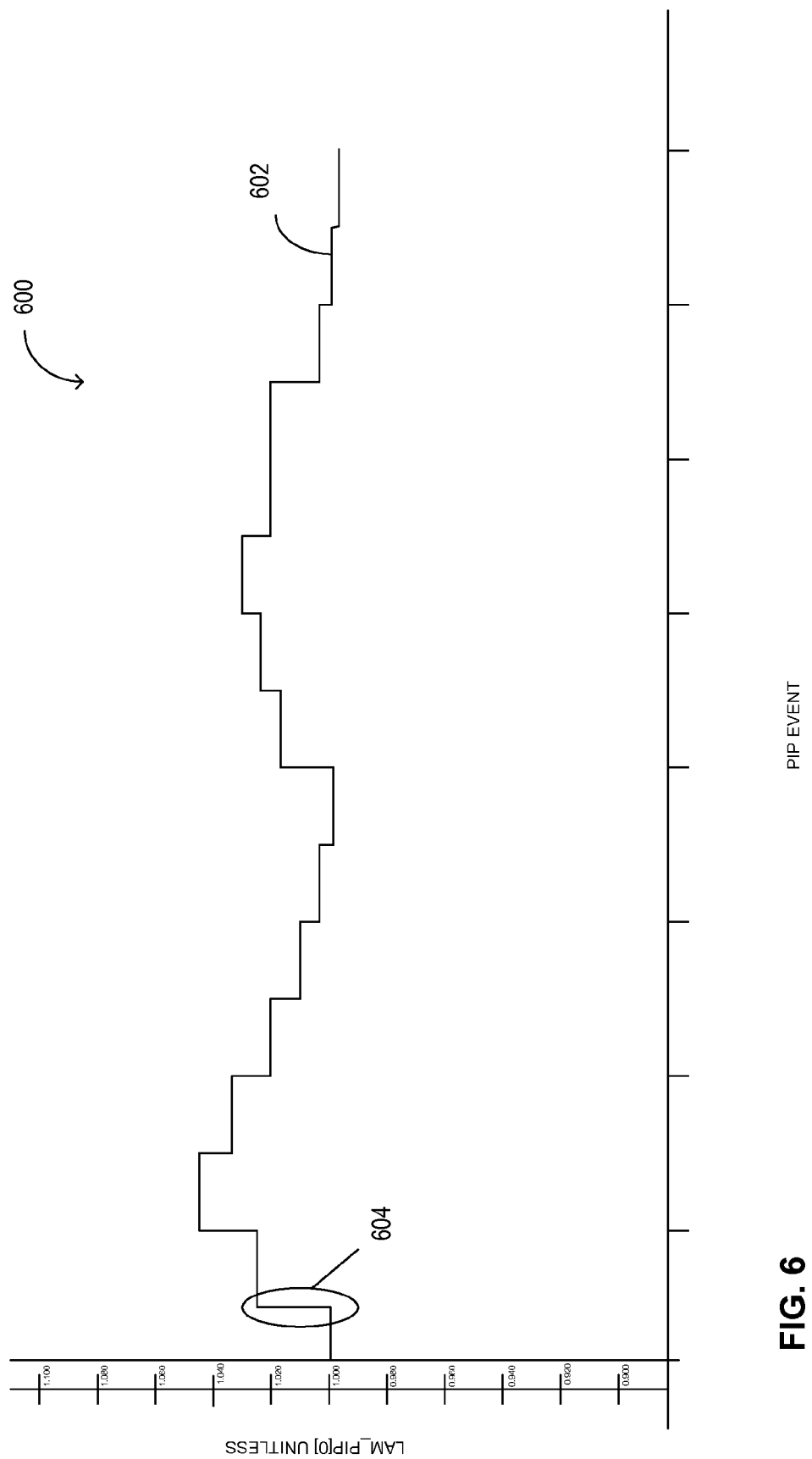
FIG. 6 shows a graph illustrating example results for vehicle data PIP events.

FIG. 6 shows a graph 602 illustrating example results for vehicle data of an example engine system, such as system 100 of FIG. 1. System 100 may be configured to sample (e.g., take a "snapshot") a signal sent by sensor 126 with a controller 12 at a time corresponding to a Profile Ignition Pickup (PIP) event, in order to monitor air/fuel ratio imbalance of the internal combustion engine for a plurality of cylinders. The sampled signal may be converted to an air/fuel ratio at the PIP, and may be used to calculate an air-fuel ratio differential (LAM_DIF). This may be done by finding the difference between an air-fuel ratio at a given PIP and the air-fuel ratio of the previous PIP event. 604 of FIG. 6 represents the graphical value of LAMDIF.

Figure 7:
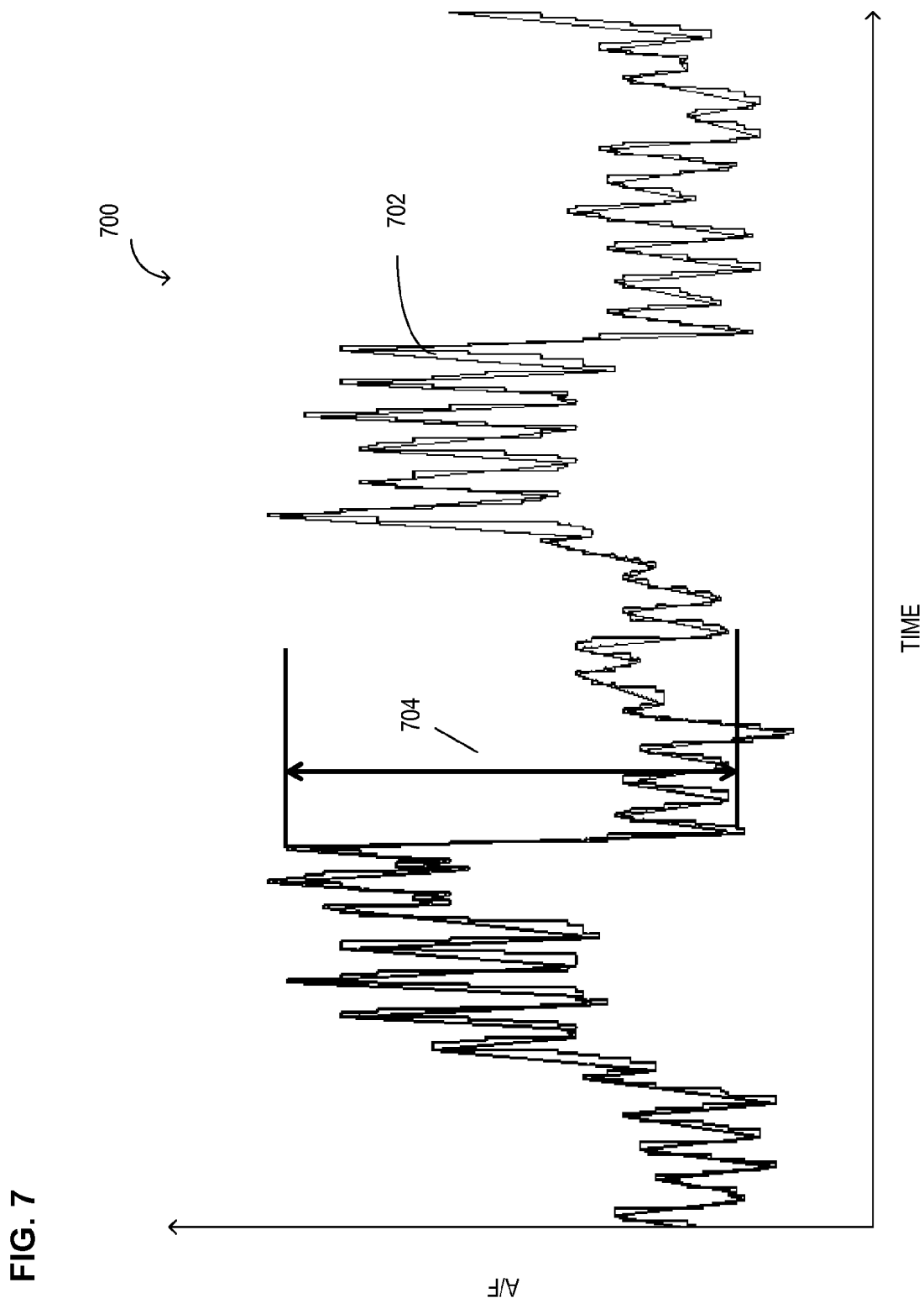
FIG. 7 shows a graph illustrating LAMDIF results for peak-to-peak differentials.

FIG. 7 illustrates plot 700 of graph 702 of air/fuel ratio over time. 704 refers to the peak-to-peak differential described in method 400. The peak-to-peak differential is calculated by finding the difference in length between two adjacent peaks on the plot, also referred to as the peak amplitude. 704 is simply one example of such a calculation. Over the given sample duration, each peak-to-peak differential is calculated and compared to an imbalance threshold, as described above with respect to FIGS. 2 and 4.

Figure 8:
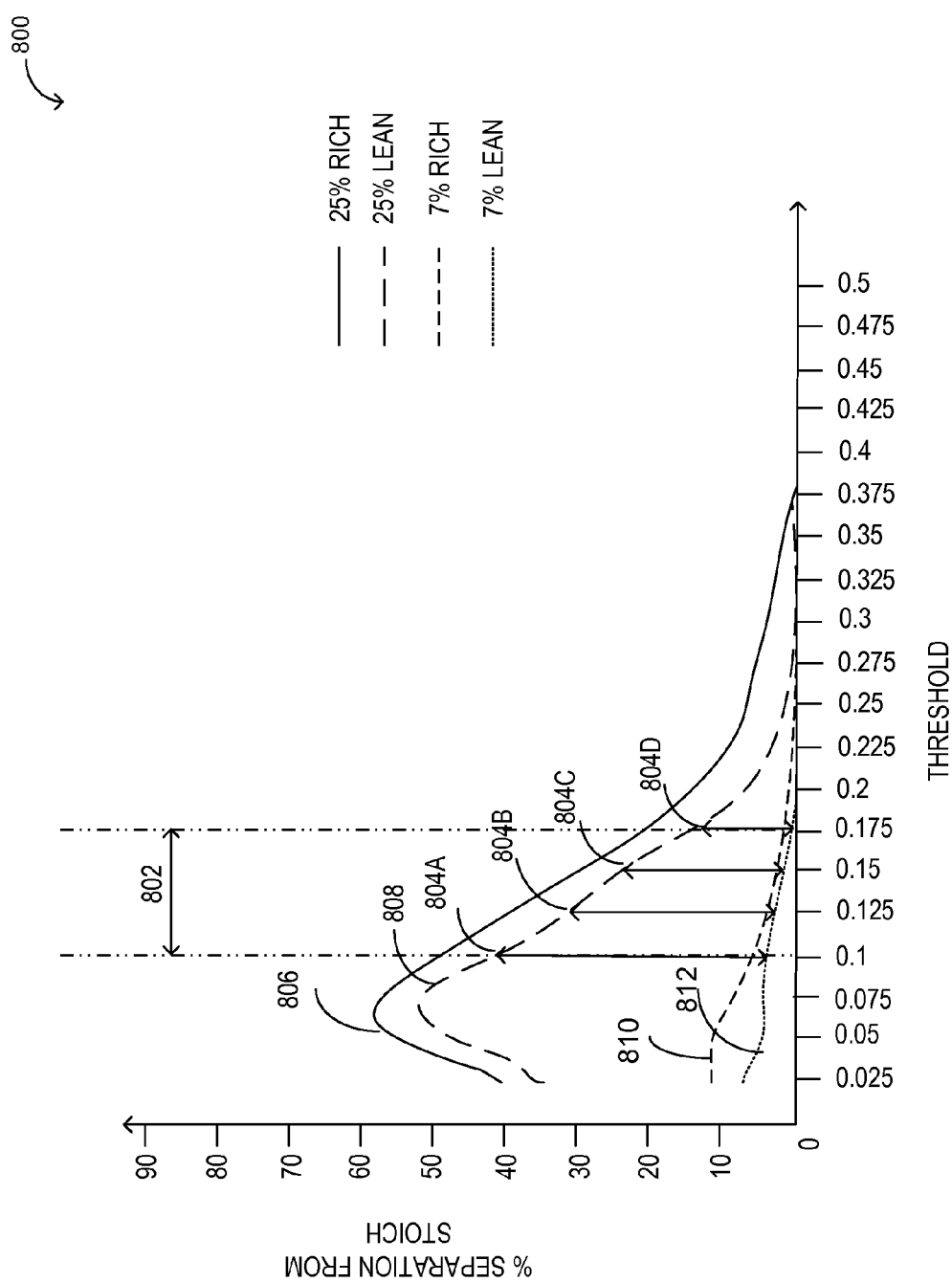
FIG. 8 shows a graph illustrating fault separation while measuring air-to-fuel percent separation from stoichiometric.

As explained previously, an air-fuel ratio differential value may be compared to a threshold in order to determine the air-fuel ratio differential represents a potential cylinder air-fuel ratio fault or if it represents a no-fault condition (e.g., values below the threshold are considered no-fault values). This threshold may be set at a level that provides for optimal separation between air-fuel ratios that deviate from stoichiometry by a large and small amount. FIG. 8 depicts plot 800 of percent separation from stoichiometric for varying levels of rich or lean air-fuel ratio. 802 represents an example threshold range providing reliable fault separation. This threshold range represents 90%-95% of the total calculated air-fuel ratio differentials (from methods 300 or 400 described above, for example) that are less than the threshold. That is, the threshold is selected such that 90-95% of all calculated differentials fall below the threshold. Fault separation, as shown by 804A-D, represents the difference between an engine at 25% lean and/or rich versus an engine at 7% lean and/or rich. The larger the percent separation from stoichiometric between 25% and 7% lean and/or rich, the better fault separation value. 806-812 represent graphs of an engine cylinder operating at 25% rich, 25% lean, 7% rich, and 7% lean, respectively.

In this way, the counting method may allow an engine controller to accurately diagnose cylinder air/fuel ratio imbalance. By counting the samples below the threshold normalized to a total number of peak-to-peak oscillations, the data may be more consistent than relying on a summation method that only counts samples larger than the threshold.

The technical effect of the count method includes counting samples below the threshold normalized to a total number of peak-to-peak oscillations and comparing that value to an imbalance threshold, in order to better control operation of the engine. If the number is below the threshold, then it may be inferred that there is a relatively large amount of samples above the threshold and that an air/fuel imbalance is present, and appropriate action can then be taken by the control system.

Thus, the systems and methods described herein provide for a method comprising determining peak-to-peak engine exhaust sensor signal difference values; counting each determined peak difference value that is lower than a first predetermined threshold; and indicating cylinder imbalance via a vehicle display element when the count of determined peak difference values lower than the first predetermined threshold decreases below a second predetermined threshold.

The determined peak-to-peak exhaust sensor signal difference values may include respective peak-to-peak amplitudes of the exhaust sensor signal. In one example, the first predetermined threshold changes as engine speed changes. The method may further comprise adjusting engine operation responsive to the indication of the cylinder imbalance. The adjusting engine operation may include lowering an engine torque limit.

Another embodiment relates to a system, comprising: an engine having a plurality of cylinders; an exhaust gas sensor; and a controller having instructions for adjusting engine operation responsive to cylinder air/fuel imbalance, the imbalance determined based on a number of counted air-fuel ratio differentials normalized to a total number of air-fuel ratio differentials calculated from feedback from the exhaust gas sensor over a given duration.

In an example, the controller has instructions for determining an air-fuel ratio differential as a peak-to-peak amplitude of a signal from the exhaust gas sensor, and determining that the air-fuel ratio differential is a counted air-fuel ratio differential if the peak-to-peak amplitude is less than a threshold.

The total number of air-fuel ratio differentials may comprise the number of counted air-fuel ratio differentials and a number of non-counted air-fuel ratio differentials, the non-counted air-fuel ratio differentials comprising peak-to-peak amplitudes that are greater than the threshold.

The system may further comprise an engine speed sensor, and the controller may include instructions for determining an air-fuel ratio differential as a difference between a first output of the exhaust gas sensor sampled when the engine speed sensor sends a first signal to the controller and a second output of the exhaust gas sensor sampled when the engine speed sensor sends a second signal to the controller, and determining that the air-fuel ratio differential is a counted air-fuel ratio differential if the difference between the first output and second output is less than a threshold.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine having a plurality of cylinders;
an exhaust gas sensor; and
a controller having instructions for:
adjusting engine operation responsive to cylinder air/fuel imbalance, the imbalance determined based on a number of counted air-fuel ratio differentials normalized to a total number of air-fuel ratio differentials calculated from feedback from the exhaust gas sensor over a given duration.

2. The system of claim 1, wherein the controller has instructions for determining an air-fuel ratio differential as a peak-to-peak amplitude of a signal from the exhaust gas sensor, and determining that the air-fuel ratio differential is a counted air-fuel ratio differential if the peak-to-peak amplitude is less than a threshold.

3. The system of claim 2, wherein the total number of air-fuel ratio differentials comprises the number of counted air-fuel ratio differentials and a number of non-counted air-fuel ratio differentials, the non-counted air-fuel ratio differentials comprising peak-to-peak amplitudes that are greater than the threshold.

4. The system of claim 1, further comprising an engine speed sensor, and wherein the controller has instructions for determining an air-fuel ratio differential as a difference between a first output of the exhaust gas sensor sampled when the engine speed sensor sends a first signal to the controller and a second output of the exhaust gas sensor sampled when the engine speed sensor sends a second signal to the controller, and determining that the air-fuel ratio differential is a counted air-fuel ratio differential if the difference between the first output and second output is less than a threshold.

5. The system of claim 1, wherein the imbalance is indicated if the normalized number of counted air-fuel ratio differentials is less than a threshold, and wherein the adjusting engine operation comprises adjusting spark timing.

6. An engine method, comprising:
adjusting engine operation responsive to cylinder air/fuel imbalance, the imbalance determined based on a total number of instances where sensed peak-to-peak exhaust air-fuel ratios differentials are less than a threshold normalized to a total number of peak-to-peak oscillations.

7. The method of claim 1, wherein the adjusting of engine operation includes limiting adjustment of feedback fueling adjustments to maintain a desired air-fuel ratio.

8. The method of claim 1, further comprising indicating the determined cylinder imbalance via a diagnostic code stored in memory.

9. The method of claim 1, wherein each sensed peak-to-peak exhaust air-fuel ratio differential comprises a respective peak-to-peak amplitude of a sampled exhaust gas sensor signal.

10. The method of claim 9, wherein to determine the total number of instances where sensed peak-to-peak exhaust air-fuel ratios differentials are less than the threshold, the method comprises:
determining each peak-to-peak amplitude of the sampled exhaust gas sensor signal over a given duration, and
setting the total number of instances as a number of the peak-to-peak amplitudes determined over the given duration that are less than the threshold.

11. The method of claim 10, wherein to normalize the total number of instances where sensed peak-to-peak exhaust air-fuel ratios differentials are less than the threshold, the method comprises dividing the number of the peak-to-peak amplitudes that are less than the threshold by a total number of peak-to-peak amplitudes determined over the given duration in order to determine a normalized number of peak-to-peak amplitudes that are less than the threshold.

12. The method of claim 11, wherein the threshold is a first threshold, and wherein the imbalance is indicated if the normalized number of the peak-to-peak amplitudes that are less than the first threshold is less than a second threshold.

13. The method of claim 12, wherein the first threshold is based on engine speed and/or engine load.

14. The method of claim 13, wherein as engine speed increases, the first threshold increases.

15. The method of claim 9, wherein the exhaust gas sensor signal is sampled at least once every cylinder firing event.

16. A method comprising:
determining peak-to-peak engine exhaust sensor signal difference values;
counting each determined peak difference value that is lower than a first predetermined threshold; and
indicating cylinder imbalance via a vehicle display element when the count of determined peak difference values lower than the first predetermined threshold decreases below a second predetermined threshold.

17. The method of claim 16 wherein the determined peak-to-peak exhaust sensor signal difference values include respective peak-to-peak amplitudes of the exhaust sensor signal.

18. The method of claim 16 wherein the first predetermined threshold changes as engine speed changes.

19. The method of claim 16, further comprising adjusting engine operation responsive to the indication of the cylinder imbalance.

20. The method of claim 19, wherein the adjusting engine operation includes lowering an engine torque limit.

* * * * *